United States Patent
Hurley

(10) Patent No.: US 10,995,872 B1
(45) Date of Patent: May 4, 2021

(54) PIVOTING SUPPORT ASSEMBLY

(71) Applicant: Lyndon J. Hurley, Harrisburg, SD (US)

(72) Inventor: Lyndon J. Hurley, Harrisburg, SD (US)

( * ) Notice: Subject to any disclaimer, the term of this patent is extended or adjusted under 35 U.S.C. 154(b) by 588 days.

(21) Appl. No.: 15/792,871

(22) Filed: Oct. 25, 2017

(51) Int. Cl.
  F16K 27/00 (2006.01)
  F16K 27/02 (2006.01)
  F16K 31/16 (2006.01)
  F16K 31/14 (2006.01)
  F16K 25/00 (2006.01)
  E03B 7/07 (2006.01)

(52) U.S. Cl.
  CPC .......... *F16K 27/0209* (2013.01); *F16K 25/00* (2013.01); *F16K 31/14* (2013.01); *F16K 31/16* (2013.01); *E03B 7/07* (2013.01)

(58) Field of Classification Search
  CPC ...... F16K 27/0209; F16K 25/00; F16K 31/14; F16K 31/16; F16K 27/00; E03B 7/07; F16M 11/2007; F16M 11/06; F16M 11/18; F16M 2200/021; F16M 2200/068
  USPC ....... 248/349.1, 276.1, 281.11, 274.1, 277.1, 248/278.1, 279.1, 282.1, 283.1, 284.1
  See application file for complete search history.

(56) References Cited

U.S. PATENT DOCUMENTS

| | | | |
|---|---|---|---|
| 4,476,968 A | 10/1984 | Urban | |
| 6,612,407 B2 | 9/2003 | Jones | |
| 6,799,664 B1 | 10/2004 | Connolly | |
| 7,338,022 B2 * | 3/2008 | Hung | F16M 11/041 248/278.1 |
| 7,522,213 B2 * | 4/2009 | Chapman | F16M 11/2064 248/178.1 |
| 8,132,769 B2 * | 3/2012 | Metelski | F16M 11/10 248/123.11 |
| 8,469,323 B1 * | 6/2013 | Deros | F16M 11/105 248/123.11 |
| 9,033,292 B2 * | 5/2015 | Lu | F16M 13/022 248/123.11 |
| 9,277,812 B2 * | 3/2016 | Bennett | A47B 81/00 |
| 10,151,966 B2 * | 12/2018 | Chapman | G03B 17/561 |
| 10,247,352 B2 * | 4/2019 | Oginski | F16M 11/08 |
| 10,260,673 B2 * | 4/2019 | Oginski | F16M 11/08 |
| 2006/0226319 A1 * | 10/2006 | Rutherford | A61B 90/60 248/276.1 |
| 2007/0023598 A1 * | 2/2007 | Kim | F16M 11/10 248/276.1 |

(Continued)

*Primary Examiner* — Nkeisha Smith
(74) *Attorney, Agent, or Firm* — Jeffrey A. Proehl; Woods, Fuller, Shultz & Smith, PC

(57) ABSTRACT

A pivoting support assembly with a selective position locking capability may include a base, a first support arm movable with respect to the base, and a first movable joint movably mounting the first support arm to the base that includes a first component and a second component. A first position locking assembly may lock a selected position of the support arm with respect to the base, and may include a drum structure of one of the first and second components of the first movable joint and a shoe structure of another one of the first and second components of the first movable joint. The shoe structure may be movable to selectively move outwardly against the drum structure to resist rotation of the drum structure with respect to the shoe structure and thereby resist movement of the first support arm with respect to the base.

20 Claims, 8 Drawing Sheets

(56) References Cited

U.S. PATENT DOCUMENTS

| | | | |
|---|---|---|---|
| 2014/0361134 A1* | 12/2014 | Chuang | F16M 11/2014 248/276.1 |
| 2015/0136926 A1* | 5/2015 | Kuo | A61B 90/50 248/280.11 |
| 2017/0150018 A1* | 5/2017 | Luoma | F16M 11/2092 |

* cited by examiner

PIVOTING SUPPORT ASSEMBLY

BACKGROUND

Field

The present disclosure relates to support apparatus and more particularly pertains to a new pivoting support assembly for supporting objects, such as valve exercising apparatus, in an easily positionable and secure manner.

SUMMARY

In one aspect, the present disclosure relates to a pivoting support assembly with a selective position locking capability. The assembly may comprise a base, a first support arm movable with respect to the base, and a first movable joint movably mounting the first support arm to the base, with the first movable joint comprising a first component mounted on the base and a second component mounted on the first support arm. The first component is movably mounted on the second component. The assembly may also include a first position locking assembly configured to lock a selected position of the first support arm with respect to the base, with the first position locking assembly being located at the first movable joint. The first position locking assembly may comprise a drum structure of one of the first and second components of the first movable joint, the drum structure having a substantially cylindrical inner surface, and a shoe structure of another one of the first and second components of the first movable joint, with the shoe structure being movable to selectively move outwardly against the inner surface of the drum structure to resist rotation of the drum structure with respect to the shoe structure and thereby resist movement of the first support arm with respect to the base.

In another aspect, the present disclosure relates to a system which may comprise a tool operating assembly and a pivoting support assembly configured to support the tool operating assembly. The assembly may comprise a base and a first support arm movable with respect to the base, with the first support arm being elongated with a first inboard end and a first outboard end. The assembly may also include a first movable joint movably mounting the first support arm to the base, with the first movable joint comprising a first component mounted on the base and a second component mounted on the first support arm and the first component being movably mounted on the second component. The assembly may further include a first position locking assembly configured to lock a selected position of the first support arm with respect to the base, with the first position locking assembly being located at the first movable joint. A second support arm may be included which is elongated with a second inboard end and a second outboard end, with the second inboard end of the second support arm being positioned proximate to the first outboard end of the first support arm and the second support arm being movable with respect to the first support arm. A second movable joint may further be included which movably mounts the second support arm to the first support arm. The second movable joint may form a biaxial pivot structure which comprises a third component mounted on the first support arm and a fourth component mounted on the second support arm, with the fourth pivot component is movably mounted on the third component. The first position locking assembly may comprise a drum structure of one of the first and second components of the first movable joint, with the drum structure having a substantially cylindrical inner surface, and a shoe structure of another one of the first and second components of the first movable joint. The shoe structure may be movable to selectively move outwardly against the inner surface of the drum structure to resist rotation of the drum structure with respect to the shoe structure and thereby resist movement of the first support arm with respect to the base.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
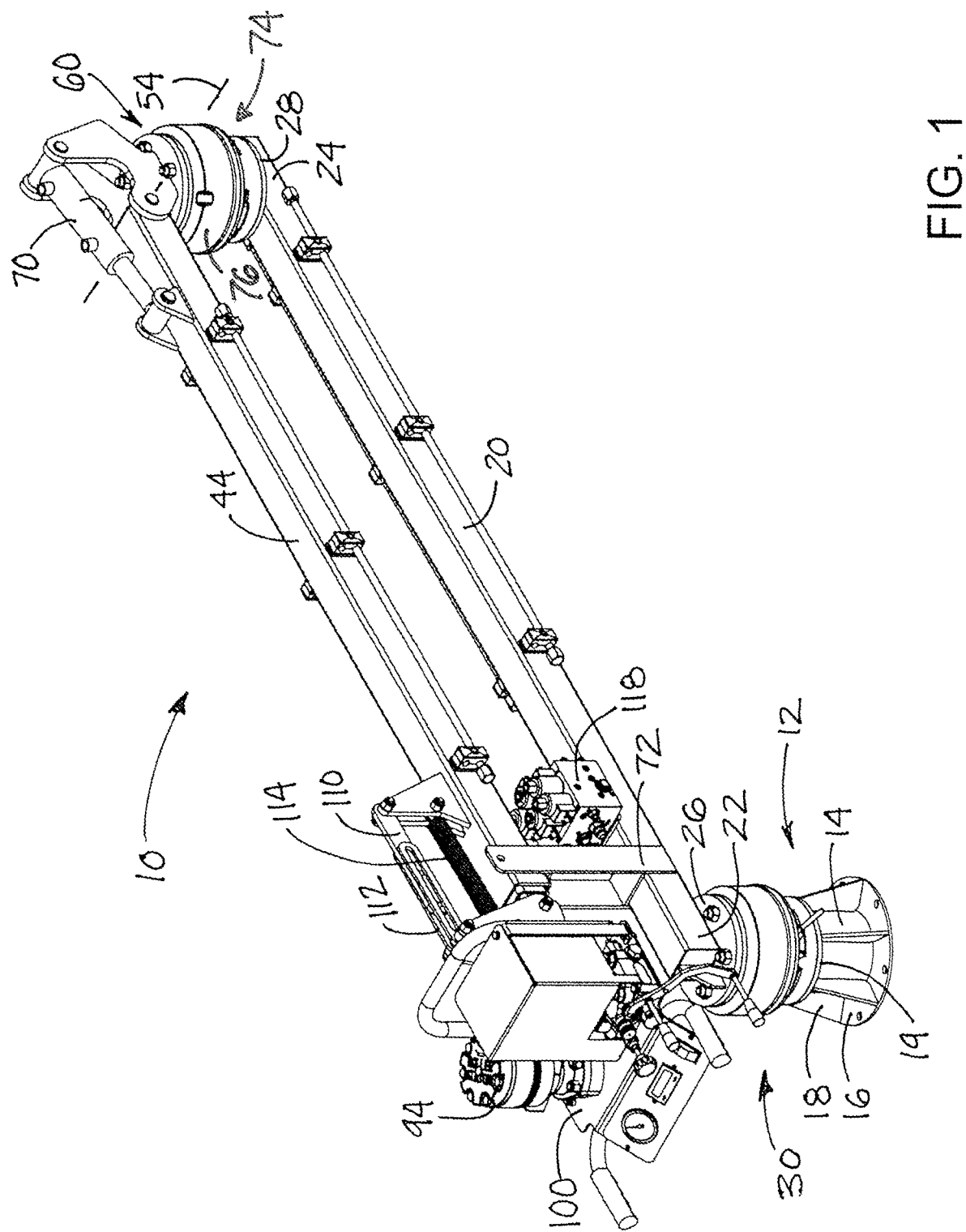
FIG. 1 is a schematic upper perspective view of a new pivoting support assembly for an apparatus, such as a valve exercising apparatus, with according to the present disclosure.
Figure 2:
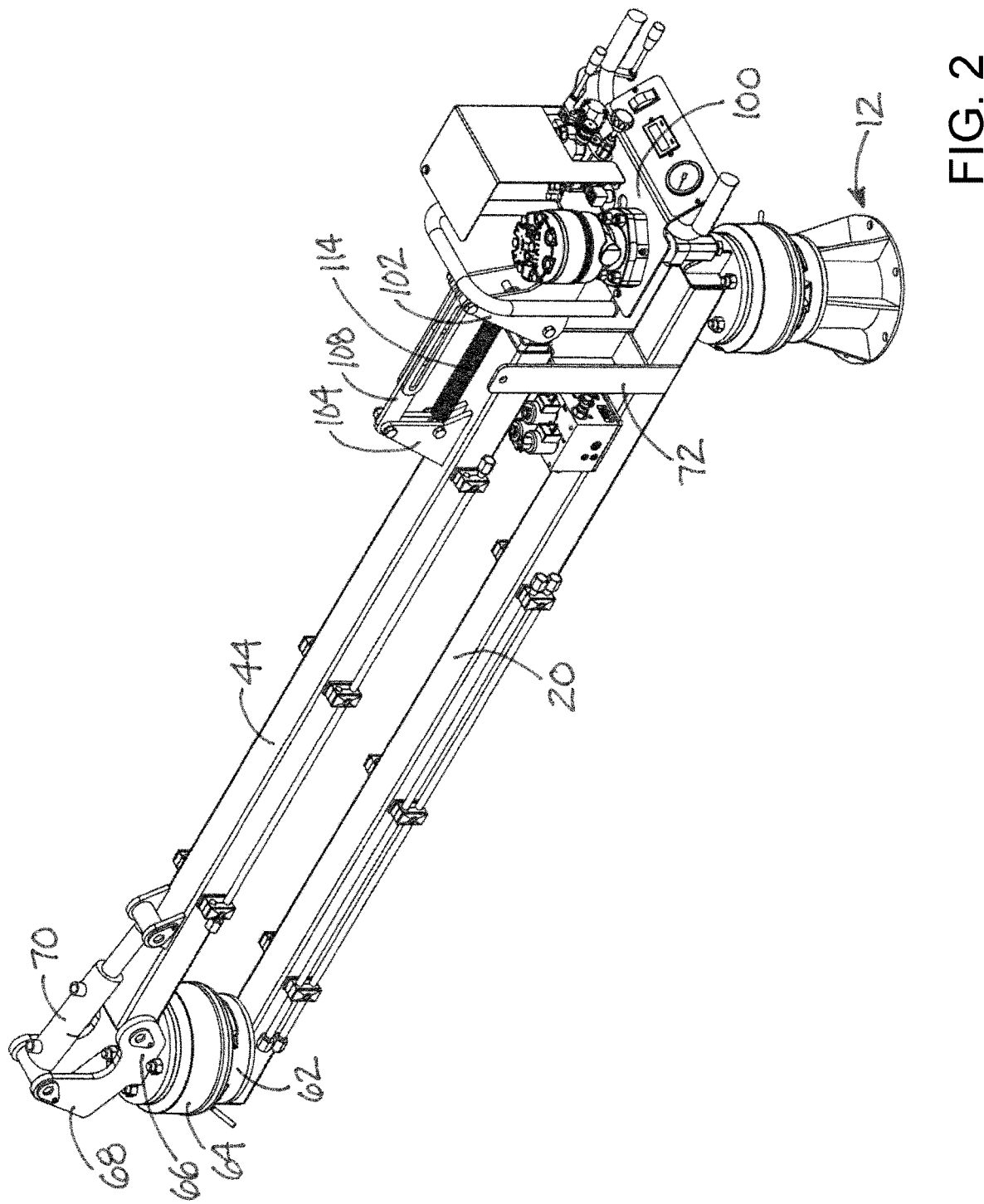
FIG. 2 is a schematic opposite upper perspective view of the support assembly with exerciser apparatus, according to an illustrative embodiment.
Figure 3:
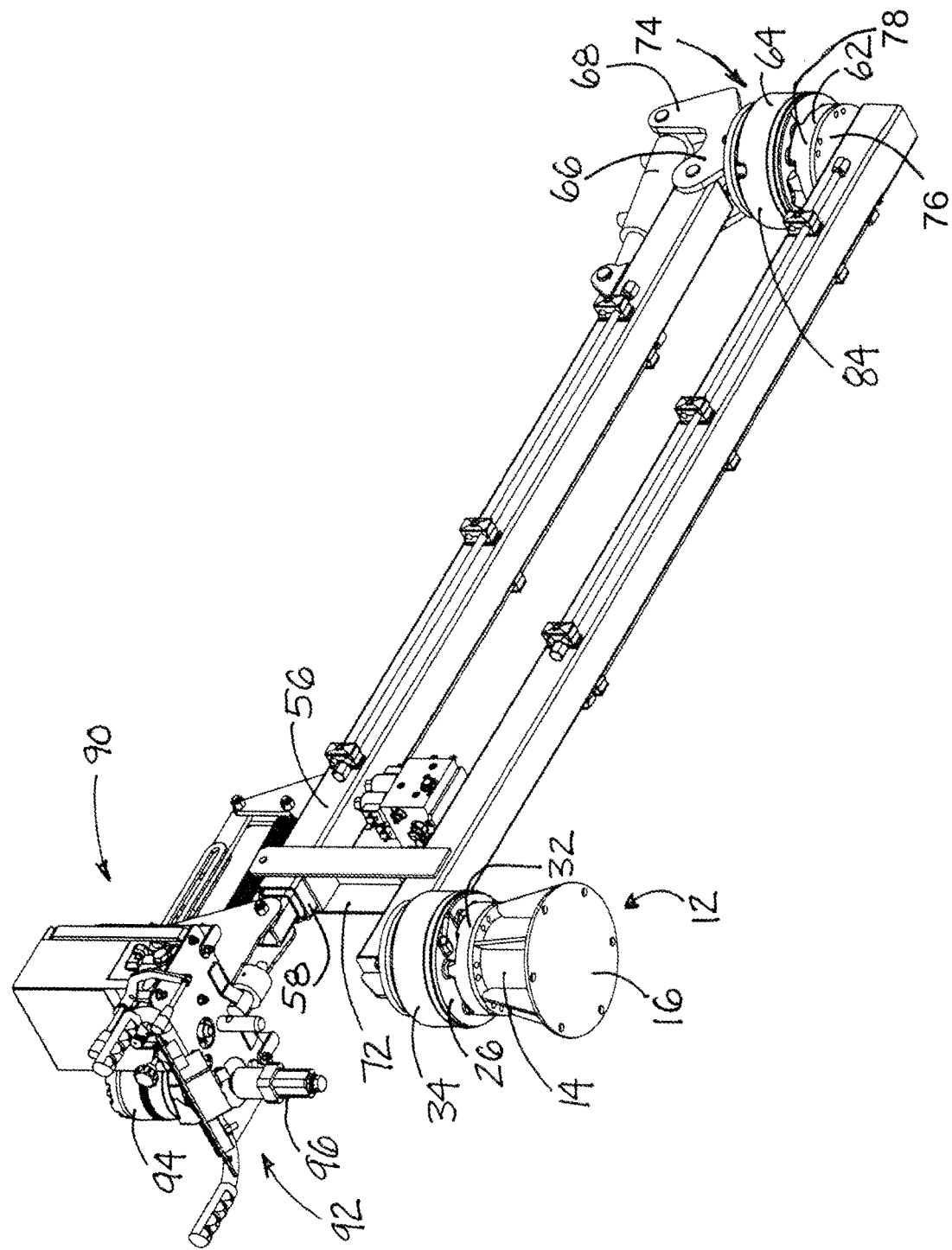
FIG. 3 is a schematic lower perspective view of the support assembly with exerciser apparatus, according to an illustrative embodiment.
Figure 4:
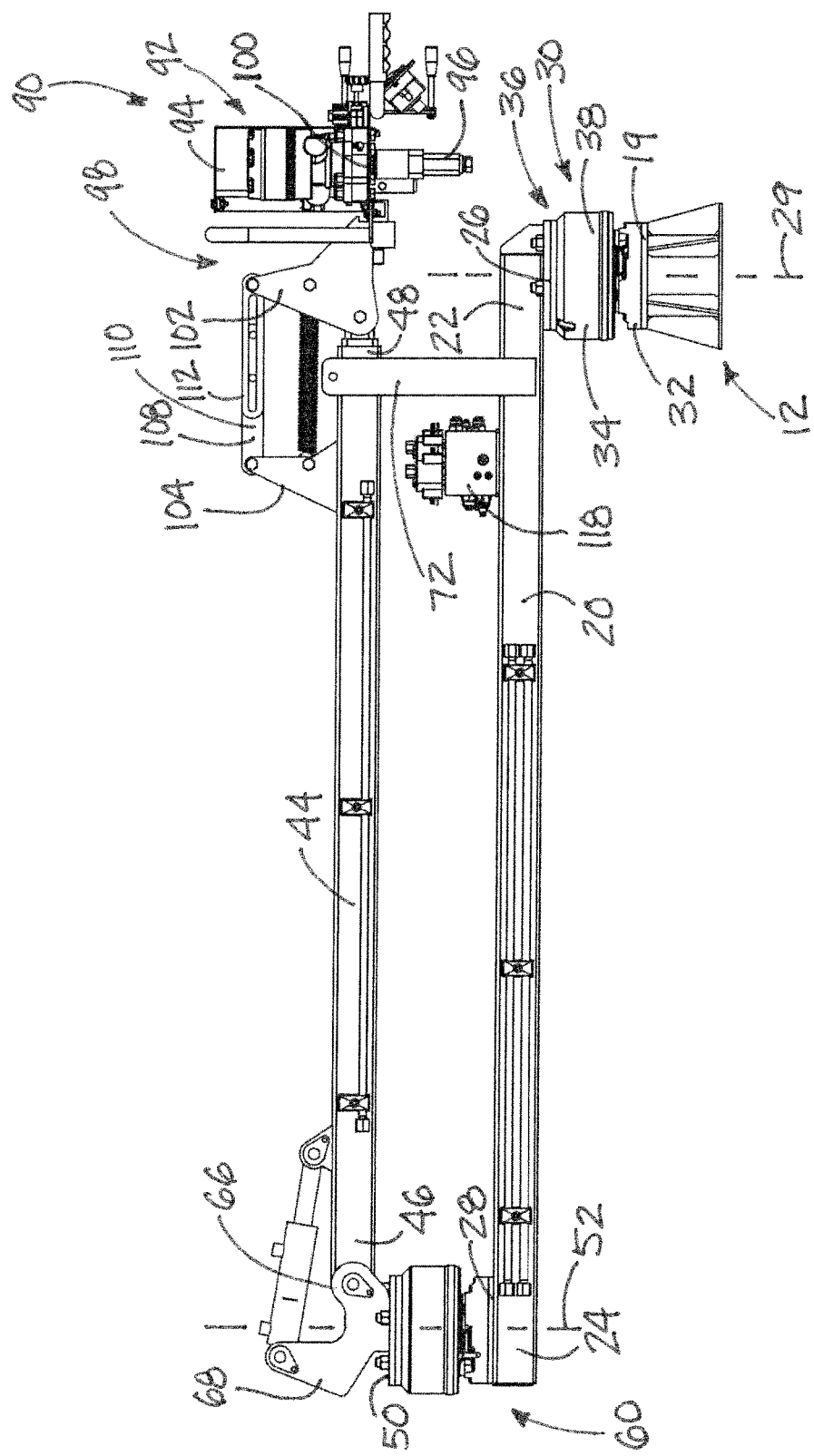
FIG. 4 is a schematic side view of the support assembly and apparatus, according to an illustrative embodiment.
Figure 5:
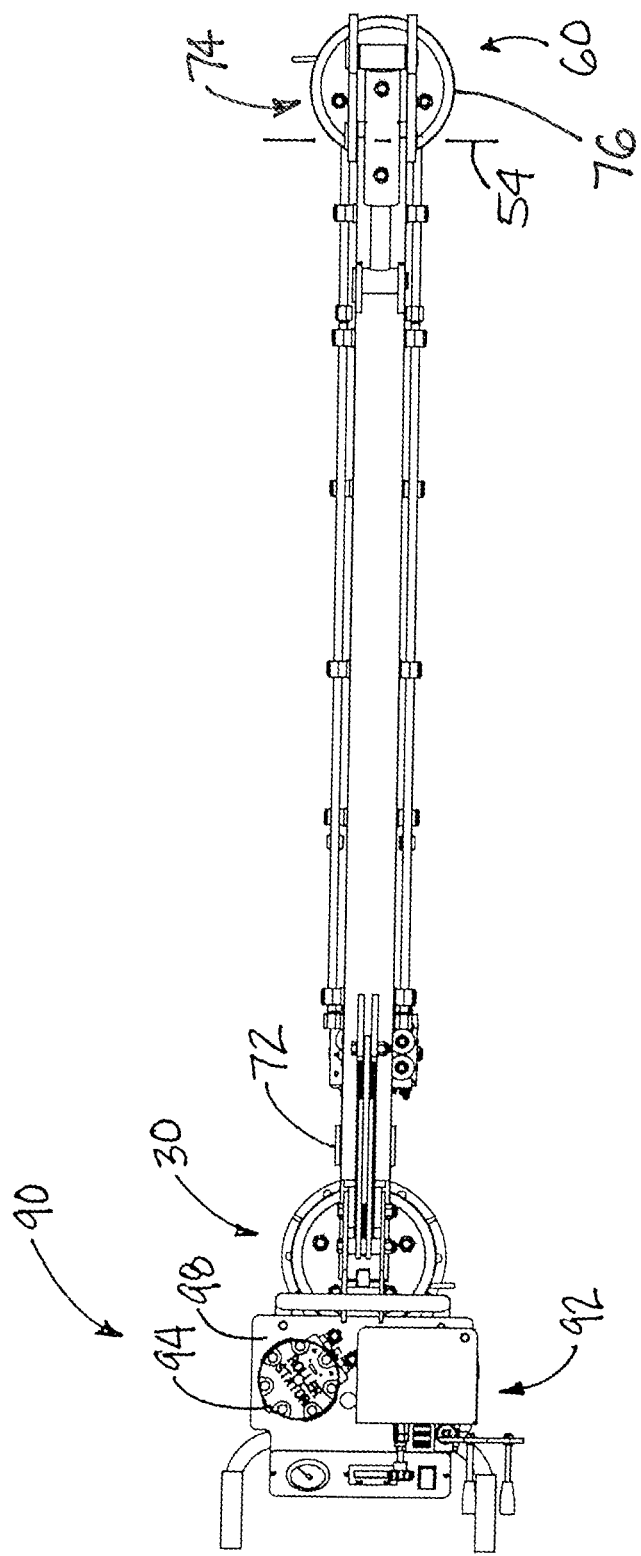
FIG. 5 is a schematic top view of the support assembly with apparatus, according to an illustrative embodiment.
Figure 6:
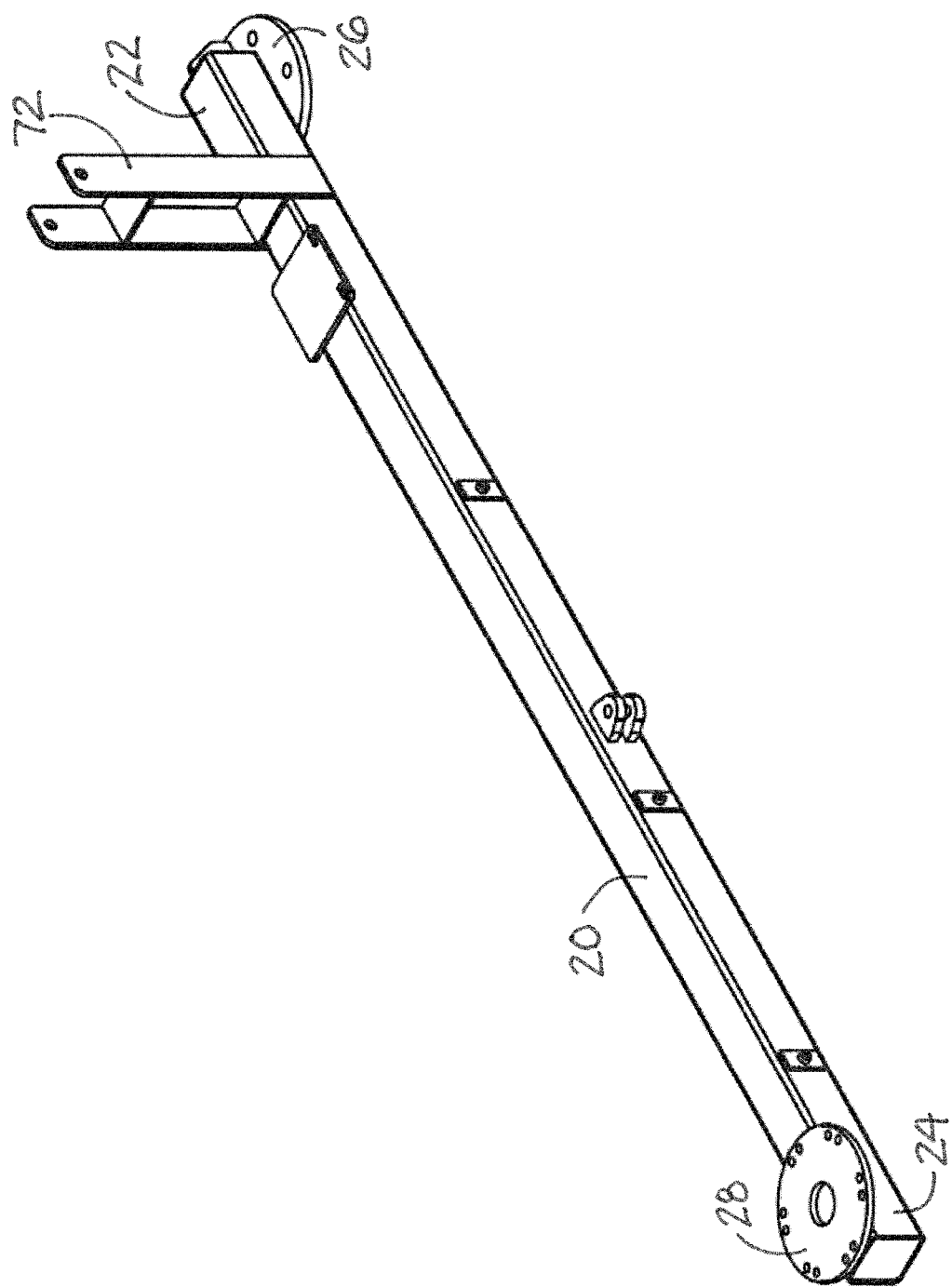
FIG. 6 is a schematic perspective view of the first support arm of the support assembly, according to an illustrative embodiment.
Figure 7:
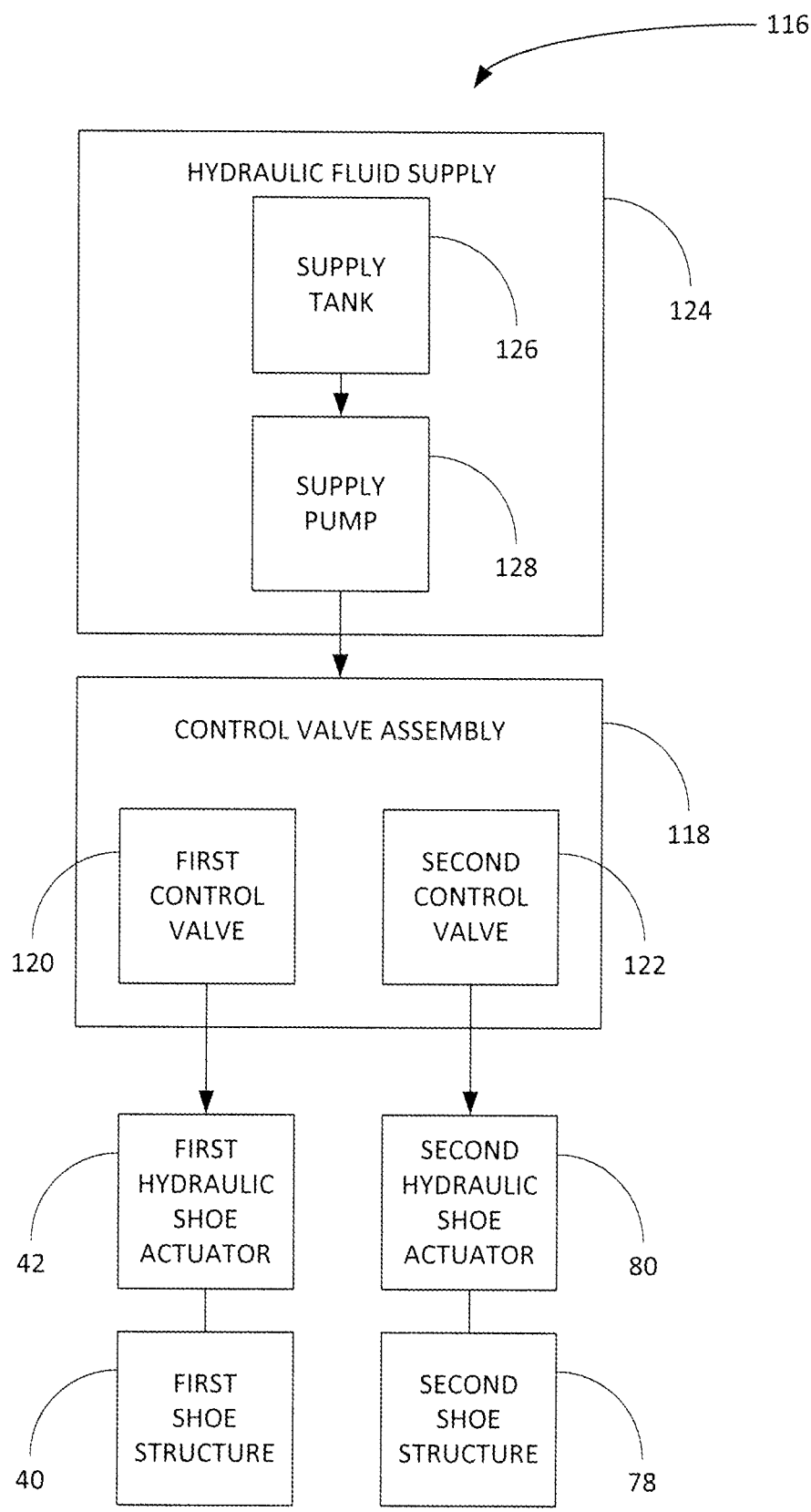
FIG. 7 is a schematic diagram of aspects of the support assembly, according to an illustrative embodiment.
Figure 8:
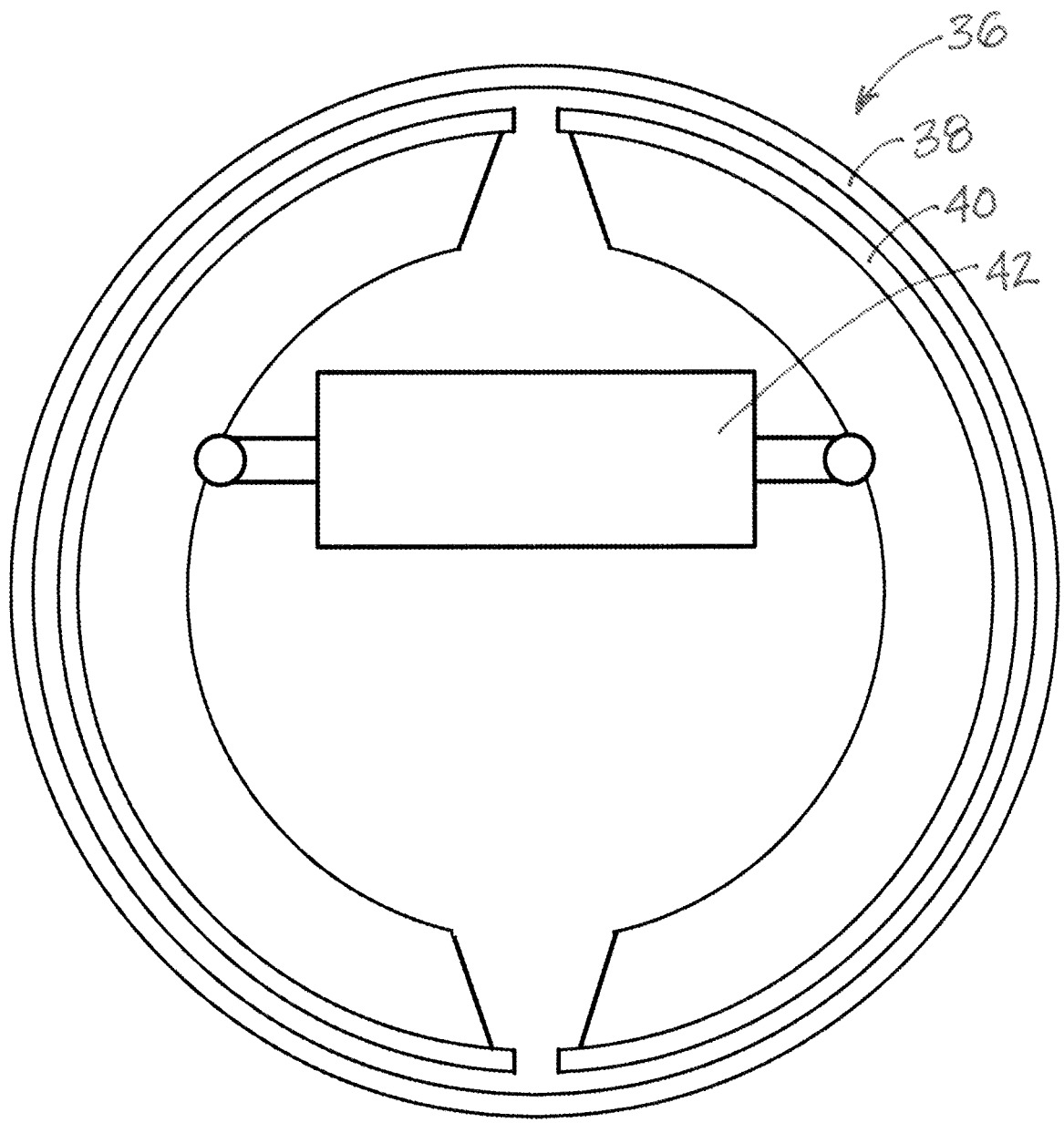
FIG. 8 is a schematic diagram of aspects of the support assembly, according to an illustrative embodiment.

With reference now to the drawings, and in particular to FIGS. 1 through 8 thereof, a new pivoting support assembly embodying the principles and concepts of the disclosed subject matter will be described.

In one aspect, the disclosure relates to a pivoting support assembly 10 with a selective position locking capability. The pivoting support assembly 10 may be employed to support various objects or devices or machines that may require a high degree of positionability in both the horizontal and vertical directions within a range of a base point, and may also require a strong and resilient holding of the object in position once the object is in the desired position.

The pivoting support assembly 10 may include a base 12 which may be mounted permanently in a single location, but more typically is positioned on a mobile base such as a vehicle or a trailer towable behind a vehicle to permit wide ranging movement of the assembly between geographically diverse locations. In greater detail, the base 12 may include a post 14 which may extend substantially vertically from the mounting point of the base. The base 12 may also include a base plate 16 from which the post extends upwardly. The base plate 16 may extend in a plane oriented substantially perpendicular to the central longitudinal axis of the vertically-extending post, and a plurality of gussets 18 may extend between the post and the base to reinforce the connection therebetween. The base 12 may also include a first lower interface plate 19 which is located at the top of the post 14.

The assembly 10 may also include a first support arm 20 which may be elongated with a first inboard end 22 located toward the base 12 and a first outboard end 24 located away from the base. A first upper interface plate 26 may be located at the first inboard end 22 in opposition to the first lower interface plate. A second lower interface plate 28 may be located at the first outboard end 24 of the arm 20.

The first support arm 20 may be movable with respect to the base to change the location of the first outboard end 24 with respect to the first inboard end and the base. The first support arm 20 may be movable with respect to the base in a substantially horizontal plane, and may be pivotable with respect to the base in the horizontal plane. The first support arm may be pivotable about a first vertical pivot axis 29 with respect to the base which may be substantially vertically oriented when the assembly is oriented for use. The pivot axis 29 may generally correspond to the central longitudinal axis of the post.

The pivoting support assembly 10 may also include a first movable joint 30 which movably mounts the first support arm 20 to the base 12, and may mount the first inboard end 22 of the arm 20 to the base. The character of the mounting may be a pivotable mounting. The first movable joint 30 may include a first pivot component 32 and a second pivot component 34, with the first pivot component being pivotally mounted on the second pivot component. In some embodiments, the second pivot component 34 may be positioned above the first pivot component. The first pivot component 32 may be mounted on the base 12, and may be mounted on the first lower interface plate 19. The second pivot component 34 may be mounted on the first support arm 20 and may be located at the first inboard end 22 of the arm 20, such as on the first upper interface plate 26 on the arm 20.

A first position locking assembly 36 may be configured to lock the first support arm 20 in a selected position with respect to the base 12. The first position locking assembly 36 may be located at the first movable joint 30, and may be integrated into the first pivot joint. In some embodiments, the first position locking assembly 36 may comprise a drum structure 38 of one of the pivot components 32, 34 of the first movable joint. The drum structure 38 may have a substantially cylindrical inner surface. The first position locking assembly 36 may also include a shoe structure 40 of the other one of the pivot components 32, 34 of the first movable joint 30. The shoe structure 40 may be movable to selectively push or press outwardly against the inner surface of the drum structure to resist rotation of the drum structure with respect to the shoe structure, and thus relative rotation between the components 32 and 34 associated with the structures 38 and 40. The shoe structure 40 may be actuated by a first hydraulic shoe actuator 42. In some in the illustrative embodiments, the shoe structure 40 forms a part of the first pivot component 32 and the drum structure forms a part of the second pivot component 34, with the drum structure being mounted on the first upper interface plate 26 of the first support arm.

The pivoting support assembly 10 may also include a second support arm 44 which may also be elongated with a second inboard end 46 and a second outboard end 48. The second inboard end 46 of the support arm 44 may be positioned proximate to the first outboard end 24 of the first support arm 20. A fourth upper interface plate 50 may be located on the second inboard end 46 of the support arm 44.

The second support arm 44 may be movable with respect to the first support arm 20, and may be movable in a substantially horizontal plane relative to the arm 20. The second support arm 44 may be pivotable about a second vertical pivot axis 52 with respect to the support arm 20, and the axis 52 may be substantially vertically oriented when the assembly 10 is oriented for use.

Additionally, the second support arm 44 may be movable with respect to the first support arm 20 in a substantially vertical plane and may be pivotable with respect to the arm 20 about a first horizontal pivot axis 54 which may be substantially horizontally oriented when the assembly 10 is oriented for use, and may be located adjacent to the second vertical pivot axis 52.

The second support arm 44 may have a length between the second inboard end 46 and the second outboard end 48, and in some embodiments the length of the second support arm may be adjustable to vary the length between the second inboard 46 and outboard 48 ends. The second support arm 44 may include an inboard section 56 located toward the second inboard end and an outboard section 58 which is located toward the second outboard end. Illustratively, the inboard and outboard sections may be in a telescopic relationship with respect to each other, and the outboard section may be at least partially received in the inboard section.

The assembly 10 may also include a second movable joint 60 which movably mounts the second support arm 44 on the first support arm 20. The second movable joint 60 may mount the second inboard end 46 of the support arm 44 to the first support arm, and illustratively to the first outboard end 24 of the first support arm. The second movable joint may pivotally mount the second support arm to the first support arm. The second movable joint 60 may include a biaxial pivot structure which permits pivoting of the second support arm 44 about both the second vertical pivot axis 52 and the first horizontal pivot axis 54 with respect to the first support arm 20.

The biaxial pivot structure may comprise a third pivot component 62 mounted on the first support arm 20, and the third pivot component may be mounted on the second lower interface plate 28 of the first support arm. The biaxial pivot structure may also include a fourth pivot component 64 which is mounted on the second support arm 44, and may be mounted on the second inboard end 46 of the second support arm. The fourth pivot component 64 may be pivotally mounted on the third pivot component 62 to pivot about the second vertical pivot axis 52, and the fourth pivot component may be positioned above the third pivot component.

In greater detail, the fourth pivot component 64 may include an arm mount 66, and the second inboard end 46 of the second support arm may be pivotally mounted on the arm mount 66. The second support arm 44 may pivot about the first horizontal pivot axis 54 with respect to the arm mount 66. The fourth pivot component may also include a mast portion 68 which extends generally upwardly with respect to the first outboard end 24 of the first support arm. The mast portion 68 may extend upwardly to a vertical level which is relatively higher than the arm mount 66 of the fourth pivot component.

The second movable joint 60 may also include an arm actuator 70 which is configured to pivot the second support arm 44 with respect to the fourth pivot component 64, and thereby with respect to the first support arm 20. The arm actuator 70 may be extendable and retractable to cause pivot movement of the second support arm 44 with respect to the fourth pivot component. The arm actuator 70 may be configured to retract to raise the second support arm with respect to the first support arm and to extend to thereby lower the second support arm with respect to the first support arm.

The first support arm 20 and second support arm 44 may be movable with respect to each other between a storage position and a variety of use positions. The stored position may be characterized by the second support arm 44 being located directly over and above the first support arm 20. The use positions may be characterized by the second support arm being pivoted to positions in which the second support arm is not located directly above the first support arm. The first support arm may include a second arm support 72 which is configured to support the first and second support arms in the storage position. The second arm support 72 may form a cradle opening upwardly into which a portion of the second support arm 44 is movable when the first and second support arms are in the storage position.

A second position locking assembly 74 may be configured to lock a selected position of the second support arm 44 with respect to the first support arm 20. The second position locking assembly 74 may be located at the second movable joint 60, and may be integrated into the second movable joint. The second position locking assembly 74 may include a drum structure 76 of one of the pivot components 62, 64 of the second movable joint 60, and the drum structure may have a substantially cylindrical inner surface.

The second position locking assembly may also include a shoe structure 78 of the other one of the pivot components 62, 64 of the second movable joint. The shoe structure 78 may be movable to selectively move outwardly against the inner surface of the drum structure 76 to resist rotation of the drum structure with respect to the shoe structure and thus the relative rotation between the components 62 and 64 associated with the structures 76 and 78. The shoe structure 78 may be actuated by a second hydraulic shoe actuator 80. Illustratively, the shoe structure 78 may form a part of the third pivot component and the drum structure 76 may form a part of the fourth pivot component 64. The drum structure 76 may be mounted on the fourth upper interface plate 50 of the second support arm.

In another aspect of the disclosure, a system may include the pivoting support assembly 10 and a tool operating assembly 90 which is supported by the support assembly 10 and may be positioned (and held in position) by the assembly 10. The tool operating assembly 90 may be mounted on the second support arm, such as on the second outboard end 48 of the support arm 44. The tool operating assembly 90 may include a tool operator 92 which may comprise a valve operating device which is configured to attach to and operate a fluid valve between open and closed conditions which may be useful, for example, in "exercising" the valve to verify and maintain the operational condition of the valve. The tool operator 92 may include a motor 94 with a downwardly extending shaft 96 which may be attached, in turn, to a rod or shaft engaged with the stem or operator of the valve.

The tool operating assembly 90 may also include a tool support structure 98 which includes a platform 100 which may be pivotally mounted on the second outboard end 48 of the second support arm. The platform 100 may be pivotally mounted on the outboard section 58 of the second arm in embodiments that employ extendable inboard and outboard sections. The tool support structure may also include a first mounting point 102 which is mounted on and extends from the platform 100 in, for example, an upward direction. The tool support structure may further include a second mounting point 104 which is mounted on and extends from the second support arm in, for example, an upward direction from the platform and may extend in a substantially parallel relationship to the first mounting point 102. The second mounting point 104 may be located toward the second outboard end 48 of the second support arm, and may be mounted on the outboard section of the second arm in embodiments having the inboard and outboard sections.

A linking element 108 of the tool support structure may link the first mounting point 102 to the second mounting point 104 to help limit pivot movement of the platform 100 with respect to the support arm 44 as extension of the linking element permits pivot movement of the platform with respect to the arm 44. The linking element 108 may include a first link 110 and a second link 112 which are mounted together to permit extension and retraction of the first link with respect to the second link within a desired range of extension which sets a range of pivot movement of the platform with respect to the arm 44. A biasing element 114 of the tool support structure may be configured to bias the linking element 108 toward a retracted condition, and thereby bias movement of the first mounting point toward the second mounting point. The biasing element 114 may be connected to the first and second mounting points, and may comprise a tension spring having one end connected to the first mounting point and an opposite end connected to the second mounting point.

The pivoting support assembly 10 may also include a control apparatus 116 which is configured to actuate the first position locking assembly 36 and the second position locking assembly 74. The control apparatus 160 may be configured to actuate the position locking assemblies into a locked condition, and may also be configured to actuate the position locking assemblies into a release condition. The locking condition may be characterized by the pivot components of the respective pivot joint resisting relative pivot movement therebetween, and the release condition may be characterized by the pivot components of the respective pivot joint being substantially free to pivot with respect to each other. Illustratively, the control apparatus 160 may include a control valve assembly 118 which is configured to control flow of hydraulic fluid to hydraulic actuators of the respective shoe structures of the first and second position locking assemblies. The control valve assembly 118 may include a first control valve 120 which is configured to control flow of hydraulic fluid to the first hydraulic shoe actuator 42 of the first position locking assembly, and a second control valve 122 which is configured to control flow of hydraulic fluid to the second hydraulic shoe actuator 80 of the second position locking assembly. The second control valve may be actuatable or operable independently of the first control valve so that operation of the first position locking assembly is independent of operation of the second position locking assembly.

The control apparatus 116 may also include a hydraulic fluid supply 124 which is in fluid communication with the control valve assembly 118. The hydraulic fluid supply 124 may include, for example, a fluid supply tank 126 configured to hold the supply of hydraulic fluid, and a fluid supply pump 128 which is in fluid communication with the fluid supply tank as well as the control valve assembly to provide pressurized hydraulic fluid to the valve assembly 118.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A pivoting support assembly with a selective position locking capability, the assembly comprising;
   a base;
   a first support arm movable with respect to the base;
   a first movable joint movably mounting the first support arm to the base, the first movable joint comprising a first component mounted on the base and a second component mounted on the first support arm, the first component being movably mounted on the second component; and
   a first position locking assembly configured to lock a selected position of the first support arm with respect to the base, the first position locking assembly being located at the first movable joint, the first position locking assembly comprising:
      a drum structure on one of the first and second components of the first movable joint, the drum structure having a substantially cylindrical inner surface;
      a shoe structure on another one of the first and second components of the first movable joint, the shoe structure being movable to selectively move outwardly against the inner surface of the drum structure to resist rotation of the drum structure with respect to the shoe structure and thereby resist movement of the first support arm with respect to the base.

2. The assembly of claim 1 wherein the first movable joint comprises a first pivot joint and the first support arm is pivotable with respect to the base about a first pivot axis.

3. The assembly of claim 1 wherein the shoe structure is actuated by a first hydraulic shoe actuator.

4. The assembly of claim 1 wherein the first support arm is elongated with a first inboard end and a first outboard end, the first inboard end being mounted to the base by the first movable joint, and additionally comprising:
   a second support arm being elongated with a second inboard end and a second outboard end, the second inboard end of the second support arm being positioned proximate to the first outboard end of the first support arm, the second support arm being movable with respect to the first support arm.

5. The assembly of claim 4 wherein the second support arm is movable with respect to the first support arm in a substantially horizontal plane.

6. The assembly of claim 5 wherein the second support arm is pivotable about a second vertical pivot axis with respect to the first support arm.

7. The assembly of claim 5 wherein the second support arm is movable with respect to the first support arm in a substantially vertical plane.

8. The assembly of claim 7 wherein the second support arm is pivotable about a first horizontal pivot axis with respect to the first support arm.

9. The assembly of claim 6 wherein the second support arm is movable with respect to the first support arm in a substantially vertical plane, the second support arm being pivotable about a first horizontal pivot axis with respect to the first support arm; and
   wherein the first horizontal pivot axis is located adjacent to the second vertical pivot axis.

10. A pivoting support assembly with a selective position locking capability, the assembly comprising;
    a base;
    a first support arm movable with respect to the base;
    a first movable joint movably mounting the first support arm to the base, the first movable joint comprising a first component mounted on the base and a second component mounted on the first support arm, the first component being movably mounted on the second component; and
    a first position locking assembly configured to lock a selected position of the first support arm with respect to the base, the first position locking assembly being located at the first movable joint, the first position locking assembly comprising:
       a drum structure on one of the first and second components of the first movable joint, the drum structure having a substantially cylindrical inner surface;
       a shoe structure on another one of the first and second components of the first movable joint, the shoe structure being movable to selectively move outwardly against the inner surface of the drum structure to resist rotation of the drum structure with respect to the shoe structure and thereby resist movement of the first support arm with respect to the base;

wherein the first support arm is elongated with a first inboard end and a first outboard end, the first inboard end being mounted to the base by the first movable joint, and additionally comprising:

a second support arm being elongated with a second inboard end and a second outboard end, the second inboard end of the second support arm being positioned proximate to the first outboard end of the first support arm, the second support arm being movable with respect to the first support arm;

wherein the second support arm has a length between the second inboard end and the second outboard end, the length of the second support arm being adjustable to vary the length between the second inboard end and the second outboard end.

11. The assembly of claim 10 wherein the second support arm has an inboard section located toward the second inboard end and an outboard section located toward the second outboard end, the inboard section and the outboard section being in a telescopic relationship with respect to each other.

12. A pivoting support assembly with a selective position locking capability, the assembly comprising;
a base;
a first support arm movable with respect to the base;
a first movable joint movably mounting the first support arm to the base, the first movable joint comprising a first component mounted on the base and a second component mounted on the first support arm, the first component being movably mounted on the second component; and
a first position locking assembly configured to lock a selected position of the first support arm with respect to the base, the first position locking assembly being located at the first movable joint, the first position locking assembly comprising:
a drum structure on one of the first and second components of the first movable joint, the drum structure having a substantially cylindrical inner surface;
a shoe structure on another one of the first and second components of the first movable joint, the shoe structure being movable to selectively move outwardly against the inner surface of the drum structure to resist rotation of the drum structure with respect to the shoe structure and thereby resist movement of the first support arm with respect to the base;
wherein the first support arm is elongated with a first inboard end and a first outboard end, the first inboard end being mounted to the base by the first movable joint, and additionally comprising:
a second support arm being elongated with a second inboard end and a second outboard end, the second inboard end of the second support arm being positioned proximate to the first outboard end of the first support arm, the second support arm being movable with respect to the first support arm;
a second movable joint movably mounting the second support arm to the first support arm, the second movable joint including a biaxial pivot structure, the biaxial pivot structure comprising:
a third component mounted on the first support arm; and
a fourth pivot component mounted on the second support arm;
wherein the fourth pivot component is movably mounted on the third component.

13. The assembly of claim 12 wherein the second movable joint comprises a second pivot joint and the second support arm is pivotable with respect to the first support arm about a second vertical pivot axis.

14. The assembly of claim 12 wherein the fourth pivot component includes:
an arm mount, the second inboard end of the second support arm being pivotally mounted on the arm mount to pivot about a first horizontal pivot axis with respect to the arm mount;
a mast portion extending generally upwardly with respect to the first outboard end of the first support arm; and
an arm actuator configured to pivot the second support arm with respect to the fourth pivot component, the arm actuator being extendable and retractable to cause pivot movement of the second support arm with respect to the fourth pivot component.

15. The assembly of claim 12 additionally comprising a second position locking assembly configured to lock a selected position of the second support arm with respect to the first support arm, the second position locking assembly being located at the second movable joint.

16. The assembly of claim 15 wherein the second position locking assembly is integrated into the second movable joint, the second position locking assembly comprising:
a drum structure of one of the pivot components of the second movable joint, the drum structure having a substantially cylindrical inner surface;
a shoe structure of another one of the pivot components of the second movable joint, the shoe structure being movable to selectively move outwardly against the inner surface of the drum structure to resist rotation of the drum structure with respect to the shoe structure and thereby resist movement of the second support arm with respect to the first support arm.

17. A system, comprising:
a tool operating assembly; and
a pivoting support assembly configured to support the tool operating assembly, the assembly comprising;
a base;
a first support arm movable with respect to the base, the first support arm being elongated with a first inboard end and a first outboard end;
a first movable joint movably mounting the first support arm to the base, the first movable joint comprising a first component mounted on the base and a second component mounted on the first support arm, the first component being movably mounted on the second component;
a first position locking assembly configured to lock a selected position of the first support arm with respect to the base, the first position locking assembly being located at the first movable joint, a second support arm being elongated with a second inboard end and a second outboard end, the second inboard end of the second support arm being positioned proximate to the first outboard end of the first support arm, the second support arm being movable with respect to the first support arm;
a second movable joint movably mounting the second support arm to the first support arm, the second movable joint forming a biaxial pivot structure comprising a third component mounted on the first support arm and a fourth pivot component mounted on the second support arm, the fourth pivot component is movably mounted on the third component;
wherein the first position locking assembly comprises:

a drum structure on one of the first and second components of the first movable joint, the drum structure having a substantially cylindrical inner surface;

a shoe structure on another one of the first and second components of the first movable joint, the shoe structure being movable to selectively move outwardly against the inner surface of the drum structure to resist rotation of the drum structure with respect to the shoe structure and thereby resist movement of the first support arm with respect to the base.

18. The system of claim 17 additionally comprising a second position locking assembly configured to lock a selected position of the second support arm with respect to the first support arm, the second position locking assembly being located at the second movable joint.

19. The system of claim 18 wherein the second position locking assembly is integrated into the second movable joint, the second position locking assembly comprising:
   a drum structure of one of the pivot components of the second movable joint, the drum structure having a substantially cylindrical inner surface;
   a shoe structure of another one of the pivot components of the second movable joint, the shoe structure being movable to selectively move outwardly against the inner surface of the drum structure to resist rotation of the drum structure with respect to the shoe structure and thereby resist movement of the second support arm with respect to the first support arm.

20. The system of claim 19 wherein the second movable joint including a biaxial pivot structure permitting the second support arm to pivot about a second vertical axis and a first horizontal axis with respect to the first support arm.

* * * * *